(12) United States Patent
Sethi et al.

(10) Patent No.: US 11,805,114 B2
(45) Date of Patent: Oct. 31, 2023

(54) ENHANCED N-LAYER SSO CONTROLLED AUTHENTICATION FOR ENTERPRISE DEVICES

(71) Applicant: Dell Products L.P., Round Rock, TX (US)

(72) Inventors: Parminder Singh Sethi, Ludhiana (IN); Suren Kumar, Vellore (IN)

(73) Assignee: Dell Products L.P., Round Rock, TX (US)

( * ) Notice: Subject to any disclaimer, the term of this patent is extended or adjusted under 35 U.S.C. 154(b) by 461 days.

(21) Appl. No.: 17/039,773

(22) Filed: Sep. 30, 2020

(65) Prior Publication Data

US 2022/0103541 A1 Mar. 31, 2022

(51) Int. Cl.
*G06F 9/455* (2018.01)
*H04L 9/40* (2022.01)

(52) U.S. Cl.
CPC ...... *H04L 63/0815* (2013.01); *G06F 9/45558* (2013.01); *H04L 63/083* (2013.01); *G06F 2009/45566* (2013.01); *G06F 2009/45587* (2013.01); *G06F 2009/45595* (2013.01)

(58) Field of Classification Search
CPC ............... H04L 63/0815; H04L 63/083; H04L 63/0807; G06F 9/45558; G06F 2009/45566; G06F 2009/45587; G06F 2009/45595
See application file for complete search history.

(56) References Cited

U.S. PATENT DOCUMENTS

| 9,172,724 B1* | 10/2015 | Reddy | G06F 9/45558 |
| 10,965,497 B1* | 3/2021 | Tregenza Dancer | H04L 12/4633 |
| 11,558,364 B2* | 1/2023 | Yue | G06F 9/45558 |
| 2009/0276774 A1* | 11/2009 | Kinoshita | G06F 21/6218 718/1 |
| 2013/0276057 A1* | 10/2013 | Smith | G06F 9/45558 726/1 |
| 2014/0007086 A1* | 1/2014 | Ross | H04L 67/565 718/1 |

(Continued)

FOREIGN PATENT DOCUMENTS

EP 2648098 A2 * 10/2013 ......... G06F 9/45558

*Primary Examiner* — Michael R Vaughan
*Assistant Examiner* — Abdullah Almamun
(74) *Attorney, Agent, or Firm* — DALY, CROWLEY, MOFFORD & DURKEE LLP (57) ABSTRACT

A system, method, and computer-readable storage medium provide single sign-on (SSO) in a nested virtualization environment by routing authentication tokens received from an authentication server through the hierarchy of virtual machines (VMs) using secure data communications tunnels between each hypervisor and its respective VMs. A key store stores SSO authentication tokens for users of the nested VMs, and a key controller ensures that each login by a user to a separate VM is associated with its own token. Each login request is uniquely tagged to identify the particular VM requesting credentials, so that the responsive authentication token can be properly routed through the hierarchy. Moreover, session preferences may be associated with each user and/or each VM, enabling a rules evaluator to determine, for each login request, whether SSO functionality should be provided or whether the user should be required instead to provide new login credentials.

17 Claims, 5 Drawing Sheets

(56) References Cited

U.S. PATENT DOCUMENTS

| | | | |
|---|---|---|---|
| 2017/0003995 A1* | 1/2017 | Hu | G06F 9/45558 |
| 2017/0329622 A1* | 11/2017 | Sherwin, Jr. | G06F 9/45533 |
| 2018/0095771 A1* | 4/2018 | Warkentin | G06F 9/4416 |
| 2020/0382482 A1* | 12/2020 | Patwardhan | H04L 63/0876 |
| 2021/0336966 A1* | 10/2021 | Gujarathi | H04L 9/3213 |
| 2022/0027184 A1* | 1/2022 | Kumar | H04L 63/0823 |

* cited by examiner

ENHANCED N-LAYER SSO CONTROLLED AUTHENTICATION FOR ENTERPRISE DEVICES

FIELD

The disclosure pertains generally to security arrangements for protecting virtual machines against unauthorized activity, and more particularly to single sign-on user authentication for nested virtual machines.

BACKGROUND

Virtualization is the process of one computer system emulating another computer system. Virtualization software such as the Hyper-V hypervisor from Microsoft Corporation of Redmond, WA allows host operating systems to create virtual machines running a variety of guest operating systems. If the computer system that is providing the emulation is itself emulated, then the virtualization is "nested". Nested virtualization is most commonly used for different enterprise purposes, virtualization training, providing guest virtualization to end users, deployment testing of "virtual clouds", testing virtualization configurations, and other cases where running multiple hypervisors on the same host server might be needed.

Figure 1:
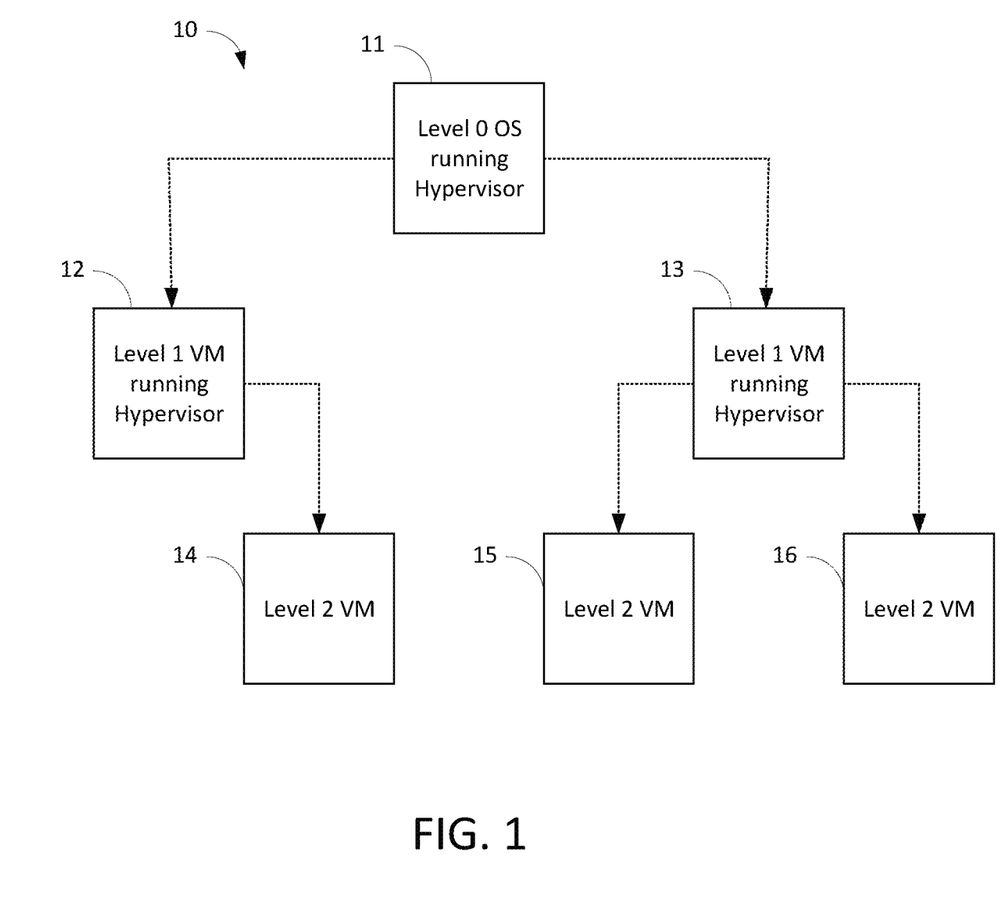
FIG. 1 is a diagram illustrating nested virtualization as known in the art.

FIG. 1 is a diagram illustrating nested virtualization 10. As shown in FIG. 1, the nested virtualization 10 has a hypervisor 11 at the root of the tree structure. The hypervisor 11 is illustratively provided as a software application running in a host operating system (OS) on physical hardware that is designated virtual "level 0". The hypervisor 11 is running two virtual machines (VMs) 12 and 13 at a virtual "level 1". Each Level 1 VM 12, 13 is an emulation of another computer running its own operating system, which may or may not be of the same type as the host operating system in which the hypervisor 11 is running. Each VM 12, 13 also is running its own hypervisor; VM 12 is emulating a "level 2" VM 14, while VM 13 is emulating two "level 2" VMs 15 and 16. The presence of the "level 2" VMs, emulated by "level 1" VMs, makes the former VMs "nested". Any or all of the "level 2" VMs 14, 15, 16 may run their own hypervisors, creating deeper levels of nesting.

In the nested virtualization 10 of FIG. 1, the operating system of each virtual machine may require each user to provide login credentials. If there are a large number of nested VMs, the process of entering these login credentials is repetitive and time consuming. The concept of single sign-on (SSO) as known in non-virtualized environments provides centralized and secure user authentication for multiple, related applications.

Figure 2:
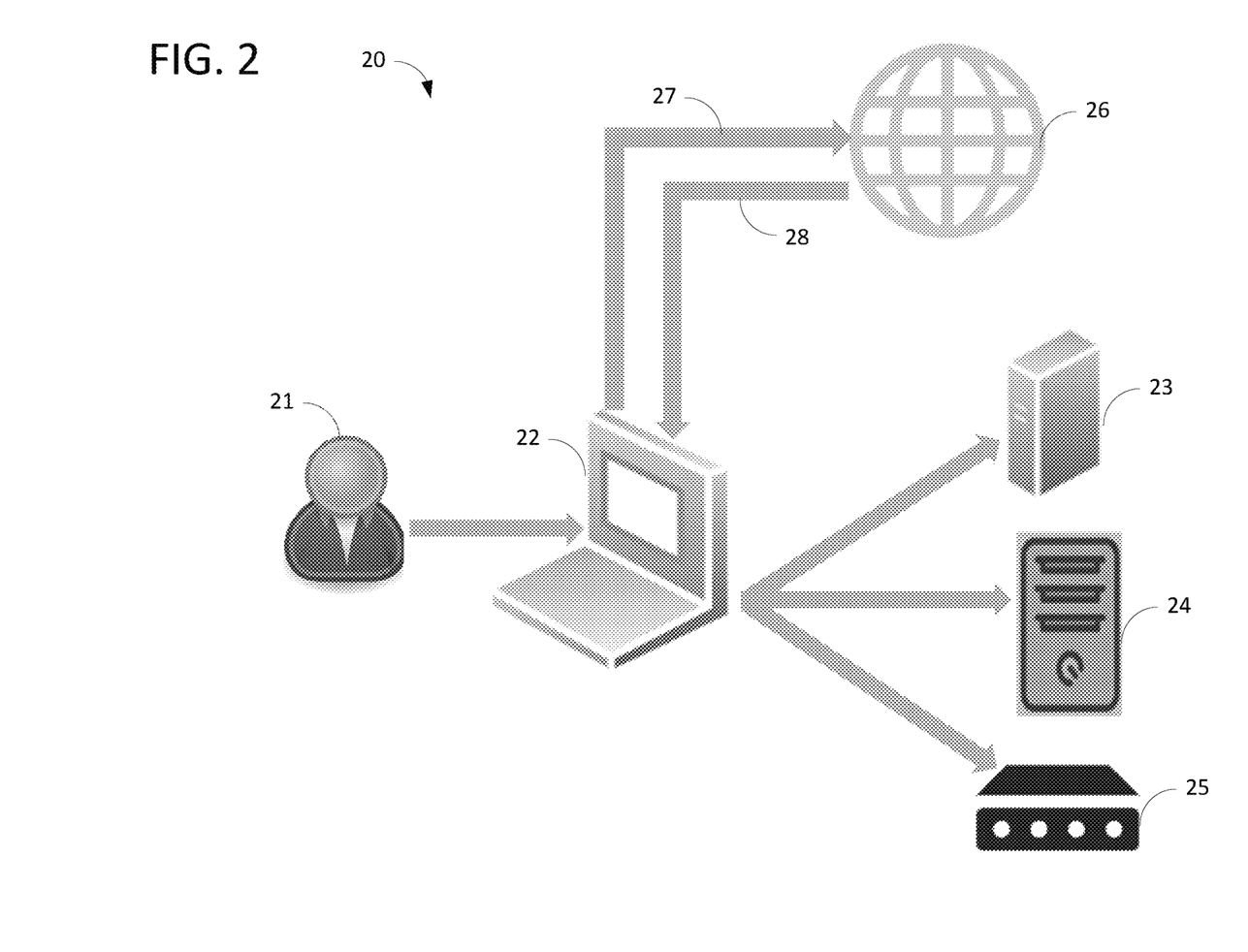
FIG. 2 is a diagram illustrating single sign-on (SSO) processes in a non-virtualized environment as known in the art.

FIG. 2 is a diagram illustrating single sign-on (SSO) processes in a non-virtualized environment 20. A user 21 desires to log into multiple devices 22, 23, 24, 25 that each requires the user 21 to be authenticated. To facilitate this authentication, all participating devices 22-25 rely on a mutually trusted authentication server 26. When the user 21 attempts to log into the first device, illustratively laptop 22, the device redirects 27 the login request to the authentication server 26. The authentication server 26 determines that the user 21 is not yet logged in for SSO, and requires the user to provide login credentials. After validating the login credentials, the authentication server 26 notes that the user 21 is now logged in for SSO, and redirects 28 the login request back to the first device with a token (typically cryptographically signed) indicating the identity of the user 21. The first device validates this token, then uses its identity information to complete the login process. When the user 21 later attempts to log into devices 23, 24, and 25, each of these devices also redirects the login request to the authentication server 26, but this time the authentication server 26 determines that the user 21 is already logged in for SSO and returns the token immediately. In this way, the user 21 does not need to provide credentials again when logging into the devices 23-25.

While SSO works well as described above, it breaks in environments using nested virtualization. In particular, if one were to attempt to implement SSO in such an environment, each login redirect from a VM would be physically sent to the authentication server by the underlying host computer, but the host computer would not understand how to forward the responsive authentication token to the correct VM for that VM to complete the login process. In other words, there is no two-way communication channel linking the authentication server with a VM that might be nested several layers deep in a tree-shaped hierarchy.

SUMMARY OF DISCLOSED EMBODIMENTS

Disclosed embodiments provide single sign-on (SSO) in a nested virtualization environment by routing authentication tokens received from an authentication server through the hierarchy of virtual machines (VMs) using secure data communications tunnels between each hypervisor and its respective VMs. A key store stores SSO authentication tokens for users of the nested VMs, and a key controller ensures that each login by a user to a separate VM is associated with its own token. Each login request is uniquely tagged to identify the particular VM requesting credentials, so that the responsive authentication token can be properly routed through the hierarchy. Moreover, session preferences may be associated with each user and/or each VM, enabling a rules evaluator to determine, for each login request, whether SSO functionality should be provided or whether the user should be required instead to provide new login credentials.

Disclosed embodiments have several advantages over the prior art. First, embodiments enable existing, nested virtualization environments to use automated authentication using SSO concepts, including the need for users to provide login credentials only once. The SSO processes are thus enabled both horizontally (i.e. for hypervisors having multiple VMs) and vertically (i.e. between hypervisors at different VM levels). Second, provision of the SSO process itself may be refined by permitting allow/disallow preferences to be expressed both per-user and per-VM. Third, because VM login requests are centrally tracked, embodiments enable analysis of these logins to produce an audit trail of logins to the various VMs.

Thus, a first embodiment is a system for providing single sign-on (SSO), using an authentication server, to a plurality of nested virtual machines executing on a host computer. The system includes a preference database operable for storing preferences, of each of a plurality of users, for accessing the plurality of nested virtual machines. The system further includes a rules evaluator operable for (a) determining, in response to receiving a request from a virtual machine in the plurality of nested virtual machines to authenticate a user in the plurality of users, whether to provide SSO authentication according to preferences of the user stored in the preference database, and (b) when SSO authentication should not be provided, requiring the user to provide login credentials. The system also includes a key store operable for storing SSO authentication tokens for the plurality of users. And the system has a key controller that is operable, when SSO authentication should be provided, to perform several functions. First, the key controller determines whether the key store contains an SSO authentication token for the user according to a key identifying the virtual machine. Next, if the key store does not contain such a token, the key controller obtains an SSO authentication token from the authentication server and stores the token in the key store using the key. Finally, the key controller transmits the token to the virtual machine, thereby authenticating the user to the virtual machine.

In some embodiments, the preference database stores preferences comprising one or more of: a number of concurrent virtual machines accessible by the user in a single session, and an idle session termination interval.

In some embodiments, the preference database stores preferences in association with one or more of the virtual machines in the plurality of nested virtual machines.

In some embodiments, the key controller is operable to index the key store using a key that identifies one or more of: the host computer, a level at which the virtual machine is nested in the plurality of nested virtual machines, a maximum number of concurrent sessions for the virtual machine, a maximum number of excess authentication attempts, and a user session count.

In some embodiments, obtaining the token from the authentication server comprises the key controller providing a domain key to the authentication server.

In some embodiments, transmitting the token to the virtual machine comprises routing the token through the plurality of nested virtual machines according to a destination that identifies the virtual machine.

Another embodiment is a method of providing single sign-on (SSO), using an authentication server, to a plurality of nested virtual machines executing on a host computer. The method includes first storing preferences, of each of a plurality of users, for accessing the plurality of nested virtual machines. Then, the method includes determining, in response to receiving a request from a virtual machine in the plurality of nested virtual machines to authenticate a user in the plurality of users, whether to provide SSO authentication according to stored preferences of the user. When SSO authentication should not be provided, the method includes requiring the user to provide login credentials. But when SSO authentication should be provided, the method includes three further processes. The first process is determining whether a key store contains an SSO authentication token for the user according to a key identifying the virtual machine. The second process, if the key store does not contain such a token, is obtaining an SSO authentication token from the authentication server and storing the token in the key store using the key. The third process is transmitting the token to the virtual machine, thereby authenticating the user to the virtual machine.

In some embodiments, storing preferences comprises storing one or more of: a number of concurrent virtual machines accessible by the user in a single session, and an idle session termination interval.

In some embodiments, storing preferences comprises storing in association with one or more of the virtual machines in the plurality of nested virtual machines.

In some embodiments, the key store is indexed using a key that identifies one or more of: the host computer, a level at which the virtual machine is nested in the plurality of nested virtual machines, a maximum number of concurrent sessions for the virtual machine, a maximum number of excess authentication attempts, and a user session count.

In some embodiments, obtaining the token from the authentication server comprises the key controller providing a domain key to the authentication server.

In some embodiments, transmitting the token to the virtual machine comprises routing the token through the plurality of nested virtual machines according to a destination that identifies the virtual machine.

Some embodiments further include analyzing keys in the key store for each user as an audit trail of authentication activities of the user within the plurality of nested virtual machines.

Another embodiment is a tangible, computer-readable storage medium, in which is non-transitorily stored computer program code for performing the above-described method or any of its variations or embodiments.

It is appreciated that the concepts, techniques, and structures described herein may be embodied in other ways, and thus that the above summary of embodiments is merely illustrative, not comprehensive.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

In this specification, including the appended claims, the following quoted terms shall have the indicated meanings that are not limited to specific embodiments, except where expressly indicated otherwise:

A "host computer" is a hardware computer system that emulates other computer systems called "virtual machines" (or "VMs").

"Nested virtualization" means emulation, by one virtual machine, of another virtual machine. The emulating VM is called the "host machine" (as distinguished from a non-emulated host computer), and the emulated VM is called the "nested virtual machine" or "nested VM".

A "hypervisor" is a system of hardware, software, or both, for creating and managing multiple virtual machines on a single host computer or host machine, so that each virtual machine has independently-emulated hardware and kernel.

"Single sign-on" or "SSO" means a system for authenticating users to a variety of related but independent applications by means of a set of user credentials that may be provided only once.

Figure 3:
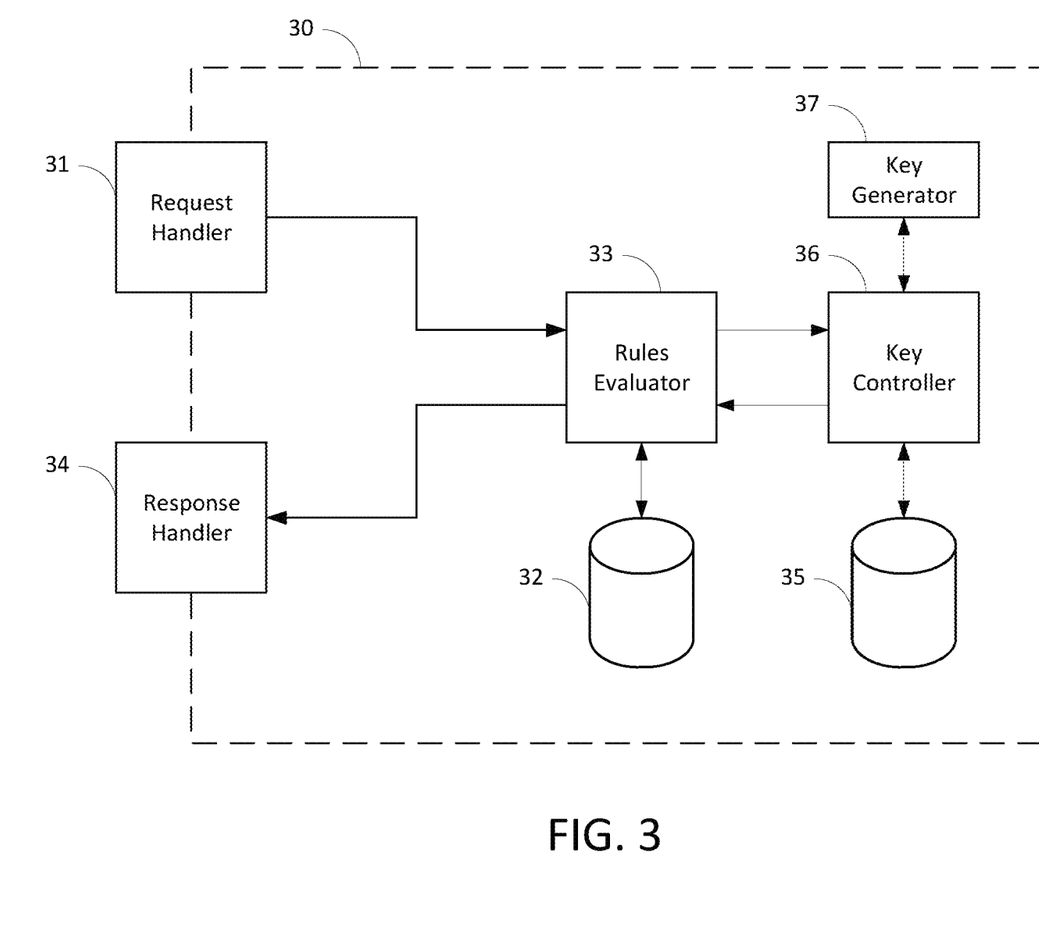
FIG. 3 schematically shows a system for providing SSO, using an authentication server, to a plurality of nested virtual machines executing on a host computer in accordance with an embodiment of the concepts, techniques, and structures disclosed herein.

In FIG. 3 is schematically shown a system 30 for providing single sign-on (SSO), using an authentication server, to a plurality of nested virtual machines executing on a host computer in accordance with an embodiment of the concepts, techniques, and structures disclosed herein. The system 30 or any of its components may be implemented using any machine or means known in the art, including without limitation the computer 50 shown in FIG. 5. In embodiments, the system 30 may be a standalone system, or it may be implemented on a device management console separate from the host computer, or as an application in the host computer operating system, or as part of the root hypervisor on the host computer, or as part of a particular virtual machine (VM) hosted by the root hypervisor or a nested hypervisor. It is appreciated that the system 30 may be implemented in other locations, and the above list of embodiments is only illustrative.

The system 30 has a request handler 31. The request handler 31 receives each login request from the host computer and each of the VMs. Each host computer, device, or VM provides a login process to accept user credentials and authorize access. In the non-nested SSO environment, such as that shown in FIG. 2, these devices are separate and do not necessarily communicate with each other, so login requests are not easily intercepted. However, in accordance with disclosed embodiments, all login requests are forwarded to the request handler 31. This functionality may be achieved because the nested virtualization begins with a root hypervisor, and commands to all VMs nested under it pass through this hypervisor. Thus, embodiments may install a trusted SSO channel between the hypervisor and the system 30, and direct the login process to always send login requests to this channel. Moreover, every login request may uniquely identify both the host computer (as the physical source of the request) and the VM (as the logical source of the request). In this way, a responsive authentication token can be transmitted to the requesting VM specifically, through the host computer's root hypervisor and the tree of VMs nested underneath it.

The system 30 also has a preference database 32 for storing preferences, of each of a plurality of users, for accessing the plurality of nested virtual machines. The preference database 32 may be implemented using any database technology known in the art. In embodiments, the stored preferences on a per-user basis may include, illustratively, a number of concurrent virtual machines accessible by the user in a single session, and an idle session termination interval after which a session is automatically terminated. These settings may be configured by the user globally, or in association with one or more of the nested virtual machines. If a user does not express any preferences for how to access the nested virtual machines, then default settings for the user may be determined on the basis of available computing resources, such as system memory or CPU capabilities in the host computer, a maximum number of simultaneously executing nested VMs, how many other users are currently accessing the nested VMs, and so on.

The system 30 has a rules evaluator 33 that receives requests from a virtual machine to authenticate a particular user, and responsively determines whether or not to provide SSO authentication according to preferences of the user stored in the preference database 32. Thus, the rules evaluator 33 converts the preferences of a particular user into policies, and compares those policies against the current state of interactions with the nested VMs. For example, if the user has set a global preference to only permit SSO authentication on a maximum of 5 simultaneous nested VMs, the rules evaluator 33 determines whether or not the received, new login request would place the user over this limit based on how many nested VMs the user is presently logged into. It is appreciated that other policies can be evaluated in a similar manner, and that the policies and preferences stated above are not intended to be comprehensive but merely illustrative of the general principle.

The system 30 also has a response handler 34. If the rules evaluator determines that a given login request would violate any of the policies for the authenticating user to access the nested VMs using SSO, and thus that SSO authentication should not be provided, it sends a rejection message to the response handler 34 for transmission back to the requesting VM. This rejection message causes the requesting VM login process to ask the user to provide his or her login credentials again. It is appreciated that this situation is not equivalent to the non-nested SSO environment of the prior art, in which a rejection of this sort essentially means that the user is "logged out" of the authentication domain. Rather, in accordance with embodiments, a given login request may violate a particular policy that the next login request does not. So forcing the user to re-authenticate does not mean the user was logged out of the authentication server. Embodiments thus provide more fine-grained control than the prior art over whether and when to grant a user seamless login using SSO.

The system 30 further has a key store 35 for storing SSO authentication tokens for the plurality of users. The key store 35 may be implemented using any database technology known in the art. The key store 35 stores one authentication token per user and per VM using a key that includes information not only about the host computer and the VM itself, but other information relating to the user and how the VM should be accessed by that user (i.e. user preference information). Thus, if the VM is reconfigured, or if the user session parameters change, the system 30 will obtain a new SSO authentication token for the user at the next login attempt.

The system 30 also has a key controller 36. As indicated above, when the rules evaluator 33 determines that a login request would violate an SSO authentication policy, it transmits a rejection message to the response handler 34 for forwarding to the requesting VM. However, when the rules evaluator 33 determines that the login request does not violate any policies, it invokes the key controller 36 to provide an appropriate authentication token for the requesting VM.

The key controller 36 first determines whether the key store 35 contains an SSO authentication token for the user according to a key identifying the virtual machine. Details of the construction of the key from the request and the user policies are described below. If the key store 35 does not contain such a token (e.g., if a certain index table does not contain the key), then the key controller 36 obtains an SSO authentication token from the authentication server and stores the new token in the key store 35 using the key as an index. The key controller 36 may include an authentication module to perform this function, or it may access another authenticator either inside or outside the system 30. Storing the authentication token in the key store 35 allows the same user to resume a terminated session at a later time, with the same credentials, but without being forced re-authenticating to the authentication server—as long as the user remains logged into the server for SSO purposes.

The SSO authentication token may be obtained by providing a domain key to the authentication server. As is known in the art, an authentication server may provide authentication services for multiple authentication domains (including but not limited to URL or website domains). Providing the domain key to the authentication server may allow the server to identify the particular domain that should be checked to see whether the particular user is currently logged in. The domain key itself may be tunneled between VMs for this purpose, using the trusted SSO channel described above.

Regardless whether the SSO authentication token was already stored in the key store 35 or whether it was freshly obtained and stored, the key controller 36 then transmits the token to the requesting virtual machine, thereby authenticating the user to the virtual machine. In detail, the key controller passes the token to the rules evaluator 33 (which has been awaiting the token). Then the rules evaluator 33 forwards the token to the response handler 34 for routing the token through the plurality of nested virtual machines according to a destination that identifies the virtual machine. This routing is accomplished by encapsulating the token in a data packet that contains routing information. The requesting VM receives this authentication token and uses it to complete the login process, without the user having to re-enter their login credentials.

Finally, the system 30 has a key generator 37 for generating keys, from an approved login request, for indexing SSO authentication tokens in the key store 35. In various embodiments, keys encode information about the host computer (to assist the authentication server in finding the appropriate authentication domain). These data may include, illustratively, a universally unique identifier (UUID) such as a service tag or serial number of the host computer.

Alternately or in addition, keys may encode information about a level at which the virtual machine is nested in the hierarchy of VMs. This level is zero (0) for the root VM, one (1) for each guest VM hosted by the root hypervisor, two (2) for each VM hosted by a first level hypervisor, and so on. The level may be used to ensure that VMs are initialized in the correct order, or to enforce policies based on user preferences about a maximum number of levels in the hierarchy, or for other, similar purposes.

Moreover, keys may encode a maximum number of concurrent sessions for the given virtual machine. A user may participate in a number of concurrent sessions with a given VM, e.g. by opening several different login windows to the VM. The maximum number of such sessions may be an important limitation on accessing the VM due to a finite amount of resources in the VM (such as a number of virtual terminal devices, or "TTYs", offered by the VM operating system). The maximum number of sessions per user for each VM may depend on different numbers of such terminals provided by different guest operating systems, an expected number of simultaneous users of the VM, administrative policies of the hypervisor operator, per-user preferences stored in the preference database 32, and resources available to the host computer, among other factors.

Further, keys may encode a maximum number of excess authentication attempts. In this context, an authentication (i.e. login) attempt is considered "excess" when it exceeds a maximum number of concurrent sessions or other policy limitation on accessing the VM. Each excess attempt will result in a failure of the VM login process to complete, and an error message to be delivered to the user. Typically, a user will recognize the error and cease attempting to login with additional concurrent sessions; however, in some cases the user will continue attempting to login, thereby generating additional excess authentication attempts. If the encoded maximum number of excess attempts is reached, the VM may take further restrictive action, such as "locking" the user's login credentials for some duration (e.g. 5, 10, or 15 minutes).

And keys may encode a user session count. That is, a particular key may indicate that the associated token stored in the key store 35 is for the user's first login session, or the second, and so on up to the maximum number. By encoding the user session count in the key used to index the key store 35, SSO authentication tokens may be separately stored in the key store 35 for each concurrent session.

Illustratively, suppose the host computer has a UUID of "EWPQS", and is hosting a guest VM at level 1 of the nested hierarchy, and this VM may have up to 4 concurrent sessions, 3 excess authentication attempts, is requesting an SSO authentication token for the first user session, and the VM itself has a UUID of "HQI". The key generator 37 may combine these data, received from the key controller 36, to form a key of "EWPQS1431HQI" that uniquely describes these conditions. The key controller 36 may then use this key to index the key store 35 to determine whether an SSO authentication token for these conditions already has been received from the authentication server, as described in more detail above.

It is appreciated that the key generator 37 may generate keys that encode information other than the data described above. It is further appreciated that the method of concatenating these data into a single key string is not limiting, as other methods such as forming structured objects as keys may be used for this purpose.

Figure 4:
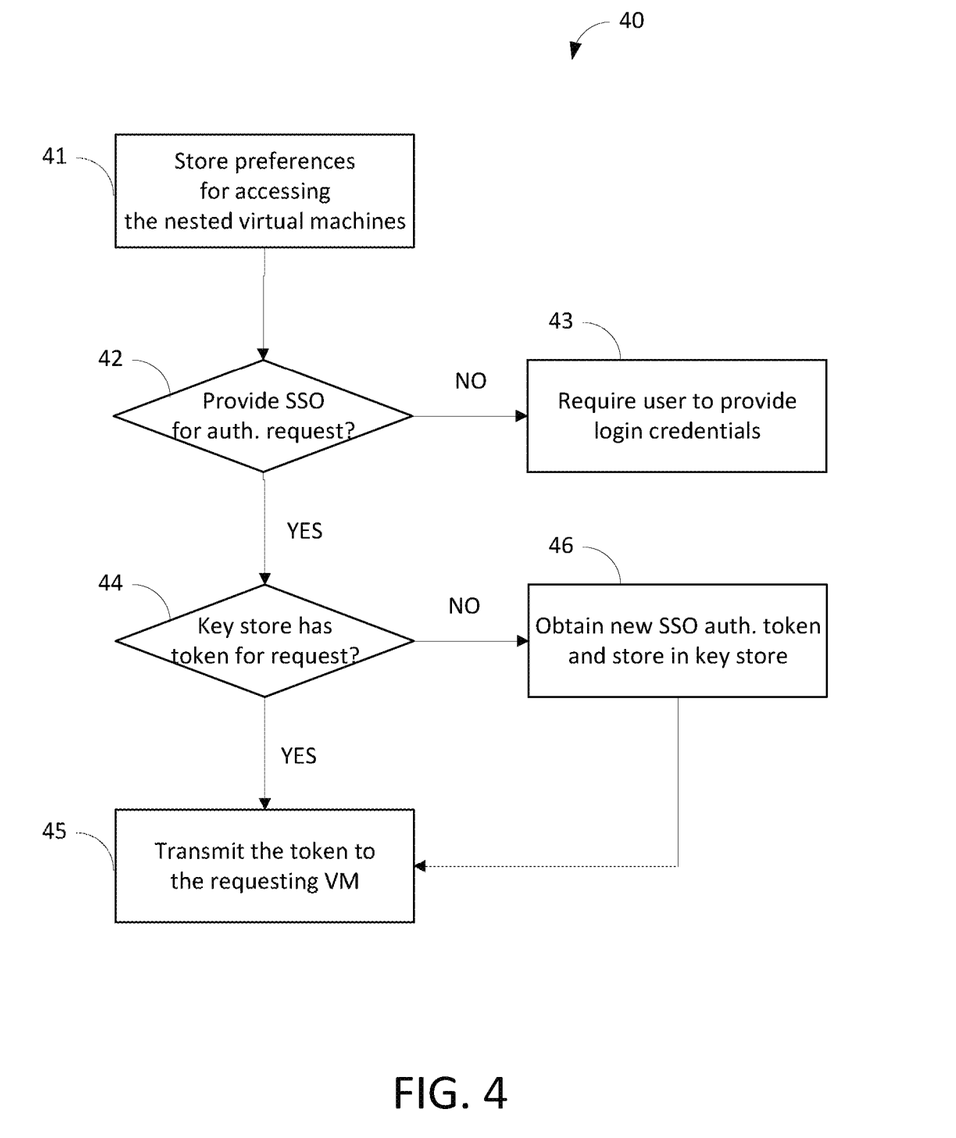
FIG. 4 is a flowchart of processes in a method of providing SSO, using an authentication server, to a plurality of nested virtual machines executing on a host computer according to an embodiment.

In FIG. 4 is shown a flowchart of processes in a method 40 of providing single sign-on (SSO), using an authentication server, to a plurality of nested virtual machines executing on a host computer according to an embodiment. The method 40 may be performed illustratively using the system 30 of FIG. 3, or the computer 50 of FIG. 5 described below in more detail, or on other devices capable of implementing its processes.

The method 40 begins with an initialization process 41 storing preferences, of each of the plurality of users, for accessing the plurality of nested virtual machines. The preferences illustratively may be stored in a preference database or similar data store. The preferences may include, as described above, one or more of: a number of concurrent virtual machines accessible by the user in a single session, and an idle session termination interval after which a session is automatically terminated. And the preferences may be stored in association with one or more of the virtual machines in the plurality of nested virtual machines. These settings may be configured by the user globally, or in association with one or more of the nested virtual machines. If a user does not express any preferences for how to access the nested virtual machines, then default settings for the user may be determined on the basis of available computing resources, such as system memory or CPU capabilities in the host computer, a maximum number of simultaneously executing nested VMs, how many other users are currently accessing the nested VMs, and so on.

The method 40 continues with an operational process 42 determining, in response to receiving a request from a virtual machine in the plurality of nested virtual machines to authenticate a user in the plurality of users, whether to provide SSO authentication according to stored preferences of the user. For example, if the user has set a global preference to only permit SSO authentication on a maximum of 5 simultaneous nested VMs, the process 42 determines whether or not the received login request would place the user over this limit. It is appreciated that other policies can be evaluated in a similar manner, and that the policies and preferences stated above are not intended to be comprehensive but merely illustrative of the general principle.

When SSO authentication should not be provided, the method 40 moves to a process 43 requiring the user to provide login credentials. The method 40 then terminates—at least, with respect to the present login request. However, if the user then provides the required login credentials (e.g. to the authentication server), the user may shortly thereafter submit a new login request, and the method 40 may resume at process 42 with respect to the new login request.

When SSO authentication should be provided, the method 40 continues to a process 44 determining whether a key store contains an SSO authentication token for the user according to a key identifying the virtual machine. The key may be generated in accordance with the above description of the operation of the key generator 37. In particular, the key may identify one or more of: the host computer, a level at which the virtual machine is nested in the plurality of nested virtual machines, a maximum number of concurrent sessions for the virtual machine, a maximum number of excess authentication attempts, and a user session count.

If the key store does contain such an SSO authentication token, the method 40 moves to a process 45 transmitting the token to the virtual machine, thereby authenticating the user to the virtual machine. The token may be transmitted to the correct virtual machine using the trusted SSO tunnel described above in connection with the request handler 31, e.g. by routing the token through the plurality of nested virtual machines according to a destination that identifies the virtual machine.

However, if the key store did not contain such a token, the method 40 moves to a process 46 obtaining an SSO authentication token from the authentication server and storing the token in the key store using the key. Obtaining the SSO authentication token from the authentication server may include providing a domain key to the authentication server. Once this is done, the method moves to the transmitting process 45 to transmit the new token to the virtual machine.

It is appreciated that embodiments of the concepts, techniques, and structures described herein advantageously permit analysis of the keys in the key store for each user to provide an audit trail of authentication activities of the user within the plurality of nested virtual machines. As described above in connection with the key generator 37, keys in the key store may encode the number of the concurrent session and the UUID of the VM for which its corresponding token was generated. Thus, one may select all of the keys for a particular user, then order these keys by the concurrent session number encoded by each key, thereby ordering the authentication activities chronologically. The keys, so ordered, may be decoded to recover the UUIDs of the corresponding VMs, to thereby discover, after the fact, the order in which the VMs were accessed. It is appreciated that other sorts of analyses of the keys in the key store may be performed to provide other audit data, and processes just described to discover the VM access sequence are illustrative only, and not limiting.

Figure 5:
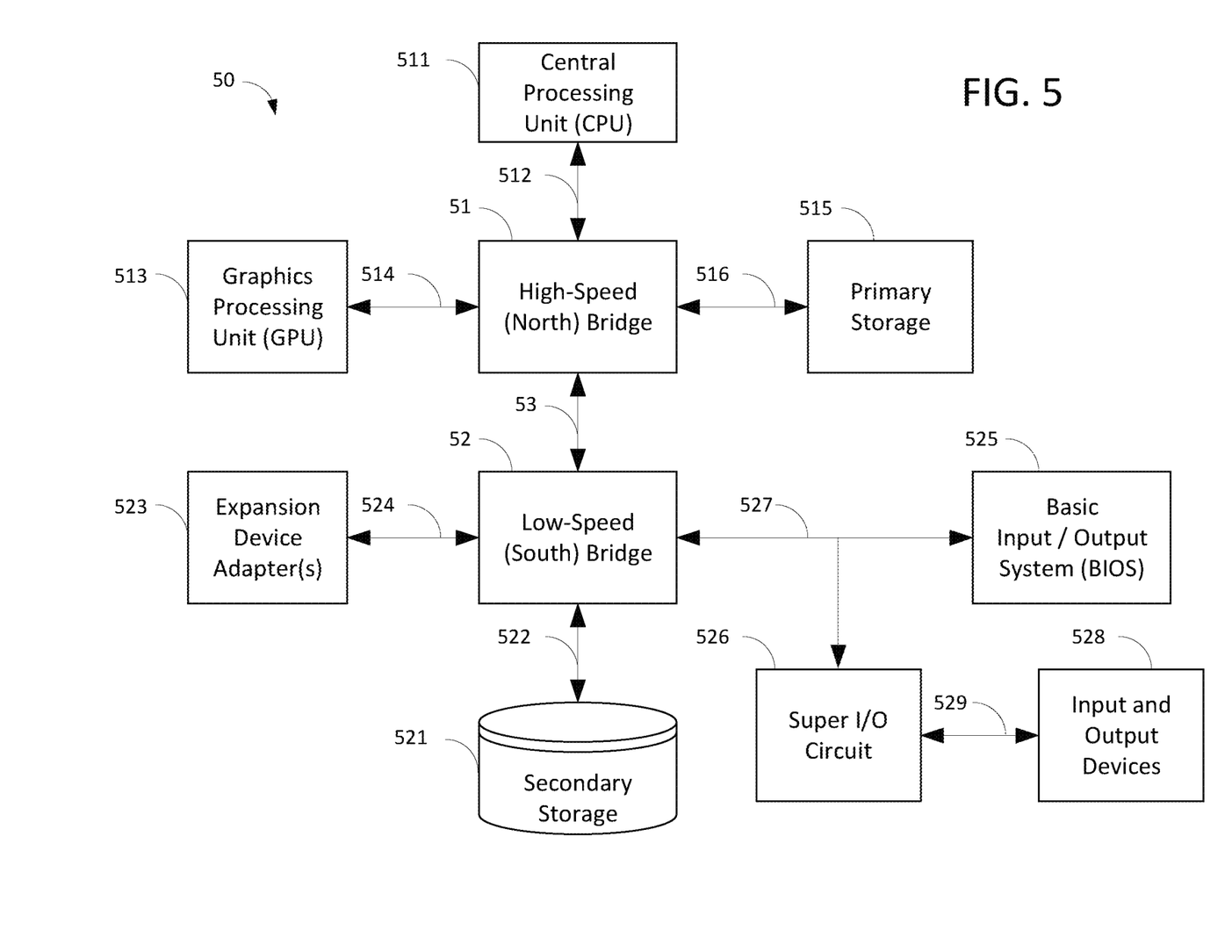
FIG. 5 schematically shows relevant physical components of a computer that may be used to embody the concepts, structures, and techniques disclosed herein.

In FIG. 5 is schematically shown relevant physical components of a computer 50 that may be used to embody the concepts, structures, and techniques disclosed herein. The computer 50 may be used to implement, in whole or in part, the system 30 of FIG. 3 or the method 40 of FIG. 4. Generally, the computer 50 has many functional components that communicate data with each other using data buses. The functional components of FIG. 5 are physically arranged based on the speed at which each must operate, and the technology used to communicate data using buses at the necessary speeds to permit such operation.

Thus, the computer 50 is arranged as high-speed components and buses 511 to 516 and low-speed components and buses 521 to 529. The high-speed components and buses 511 to 516 are coupled for data communication using a high-speed bridge 51, also called a "northbridge," while the low-speed components and buses 521 to 529 are coupled using a low-speed bridge 52, also called a "southbridge."

The computer 50 includes a central processing unit ("CPU") 511 coupled to the high-speed bridge 51 via a bus 512. The CPU 511 is electronic circuitry that carries out the instructions of a computer program. As is known in the art, the CPU 511 may be implemented as a microprocessor; that is, as an integrated circuit ("IC"; also called a "chip" or "microchip"). In some embodiments, the CPU 511 may be implemented as a microcontroller for embedded applications, or according to other embodiments known in the art.

The bus 512 may be implemented using any technology known in the art for interconnection of CPUs (or more particularly, of microprocessors). For example, the bus 512 may be implemented using the HyperTransport architecture developed initially by AMD, the Intel QuickPath Interconnect ("QPI"), or a similar technology. In some embodiments, the functions of the high-speed bridge 51 may be implemented in whole or in part by the CPU 511, obviating the need for the bus 512.

The computer 50 includes one or more graphics processing units (GPUs) 513 coupled to the high-speed bridge 51 via a graphics bus 514. Each GPU 513 is designed to process commands from the CPU 511 into image data for display on a display screen (not shown). In some embodiments, the CPU 511 performs graphics processing directly, obviating the need for a separate GPU 513 and graphics bus 514. In other embodiments, a GPU 513 is physically embodied as an integrated circuit separate from the CPU 511 and may be physically detachable from the computer 50 if embodied on an expansion card, such as a video card. The GPU 513 may store image data (or other data, if the GPU 513 is used as an auxiliary computing processor) in a graphics buffer.

The graphics bus 514 may be implemented using any technology known in the art for data communication between a CPU and a GPU. For example, the graphics bus 514 may be implemented using the Peripheral Component Interconnect Express ("PCI Express" or "PCIe") standard, or a similar technology.

The computer 50 includes a primary storage 515 coupled to the high-speed bridge 51 via a memory bus 516. The primary storage 515, which may be called "main memory" or simply "memory" herein, includes computer program instructions, data, or both, for use by the CPU 511. The primary storage 515 may include random-access memory ("RAM"). RAM is "volatile" if its data are lost when power is removed, and "non-volatile" if its data are retained without applied power. Typically, volatile RAM is used when the computer 50 is "awake" and executing a program, and when the computer 50 is temporarily "asleep", while non-volatile RAM ("NVRAM") is used when the computer 50 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 516 may be implemented using any technology known in the art for data communication between a CPU and a primary storage. The memory bus 516 may comprise an address bus for electrically indicating a storage address, and a data bus for transmitting program instructions and data to, and receiving them from, the primary storage 515. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 50 may use up to $8*2^{32}=32$ gigabytes (GB) of primary storage 515. In this example, the memory bus 516 will have a total width of 64+32=96 bits. The computer 50 also may include a memory controller circuit (not shown) that converts electrical signals received from the memory bus 516 to electrical signals expected by physical pins in the primary storage 515, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 511, the graphics processing units 513, the primary storage 515, and the high-speed bridge 51, or any combination thereof, as a single integrated circuit. In such embodiments, buses 512, 514, 516 may form part of the same integrated circuit and need not be physically separate. Other designs for the computer 50 may embody the functions of the CPU 511, graphics processing units 513, and the primary storage 515 in different configurations, obviating the need for one or more of the buses 512, 514, 516.

The depiction of the high-speed bridge 51 coupled to the CPU 511, GPU 513, and primary storage 515 is merely exemplary, as other components may be coupled for communication with the high-speed bridge 51. For example, a network interface controller ("NIC" or "network adapter") may be coupled to the high-speed bridge 51, for transmitting and receiving data using a data channel. The NIC may store data to be transmitted to, and received from, the data channel in a network data buffer.

The high-speed bridge 51 is coupled for data communication with the low-speed bridge 52 using an internal data bus 53. Control circuitry (not shown) may be required for transmitting and receiving data at different speeds. The internal data bus 53 may be implemented using the Intel Direct Media Interface ("DMI") or a similar technology.

The computer 50 includes a secondary storage 521 coupled to the low-speed bridge 52 via a storage bus 522. The secondary storage 521, which may be called "auxiliary memory", "auxiliary storage", or "external memory" herein, stores program instructions and data for access at relatively low speeds and over relatively long durations. Since such durations may include removal of power from the computer 50, the secondary storage 521 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 522 may be implemented using any technology known in the art for data communication between a CPU and a secondary storage and may include a host adaptor (not shown) for adapting electrical signals from the low-speed bridge 52 to a format expected by physical pins on the secondary storage 521, and vice versa. For example, the storage bus 522 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 50 also includes one or more expansion device adapters 523 coupled to the low-speed bridge 52 via a respective one or more expansion buses 524. Each expansion device adapter 523 permits the computer 50 to communicate with expansion devices (not shown) that provide additional functionality. Such additional functionality may be provided on a separate, removable expansion card, for example an additional graphics card, network card, host adaptor, or specialized processing card.

Each expansion bus 524 may be implemented using any technology known in the art for data communication between a CPU and an expansion device adapter. For example, the expansion bus 524 may transmit and receive electrical signals using a Peripheral Component Interconnect ("PCI") standard, a data networking standard such as an Ethernet standard, or a similar technology.

The computer 50 includes a basic input/output system ("BIOS") 525 and a Super I/O circuit 526 coupled to the low-speed bridge 52 via a bus 527. The BIOS 525 is a non-volatile memory used to initialize the hardware of the computer 50 during the power-on process. The Super I/O circuit 526 is an integrated circuit that combines input and output ("I/O") interfaces for low-speed input and output devices 528, such as a serial mouse and a keyboard. In some embodiments, BIOS functionality is incorporated in the Super I/O circuit 526 directly, obviating the need for a separate BIOS 525.

The bus 527 may be implemented using any technology known in the art for data communication between a CPU, a BIOS (if present), and a Super I/O circuit. For example, the bus 527 may be implemented using a Low Pin Count ("LPC") bus, an Industry Standard Architecture ("ISA") bus, or similar technology. The Super I/O circuit 526 is coupled to the I/O devices 528 via one or more buses 529. The buses 529 may be serial buses, parallel buses, other buses known in the art, or a combination of these, depending on the type of I/O devices 528 coupled to the computer 50.

The techniques and structures described herein may be implemented in any of a variety of different forms. For example, features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used to implement the method 40 of FIG. 4 include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for providing single sign-on (SSO), using an authentication server, to a plurality of nested virtual machines executing on a host computer, the system comprising:
   a preference database operable for storing preferences, of each of a plurality of users, for accessing the plurality of nested virtual machines;
   a rules evaluator operable for (a) determining, in response to receiving a request from a virtual machine in the plurality of nested virtual machines to authenticate a user in the plurality of users, whether to provide SSO authentication according to preferences of the user stored in the preference database, and (b) when SSO authentication should not be provided, requiring the user to provide login credentials;
   a key store operable for storing SSO authentication tokens for the plurality of users; and
   a key controller operable, when SSO authentication should be provided, for:
      determining whether the key store contains an SSO authentication token for the user according to a key identifying the virtual machine,
      if the key store does not contain such a token, obtaining an SSO authentication token from the authentication server and storing the token in the key store using the key, and
      transmitting the token to the virtual machine by routing the token through the plurality of nested virtual machines according to a destination that identifies the virtual machine, thereby authenticating the user to the virtual machine.

2. The system according to claim 1, wherein the preference database stores preferences comprising one or more of: a number of concurrent virtual machines accessible by the user in a single session, and an idle session termination interval.

3. The system according to claim 1, wherein the preference database stores preferences in association with one or more of the virtual machines in the plurality of nested virtual machines.

4. The system according to claim 1, wherein the key controller is operable to index the key store using a key that identifies one or more of: the host computer, a level at which the virtual machine is nested in the plurality of nested virtual machines, a maximum number of concurrent sessions for the virtual machine, a maximum number of excess authentication attempts, and a user session count.

5. The system according to claim 1, wherein obtaining the SSO authentication token from the authentication server comprises the key controller providing a domain key to the authentication server.

6. A method of providing single sign-on (SSO), using an authentication server, to a plurality of nested virtual machines executing on a host computer, the method comprising:
   storing preferences, of each of a plurality of users, for accessing the plurality of nested virtual machines;
   determining, in response to receiving a request from a virtual machine in the plurality of nested virtual machines to authenticate a user in the plurality of users, whether to provide SSO authentication according to stored preferences of the user;
   when SSO authentication should not be provided, requiring the user to provide login credentials; and
   when SSO authentication should be provided:
      determining whether a key store contains an SSO authentication token for the user according to a key identifying the virtual machine,
      if the key store does not contain such a token, obtaining an SSO authentication token from the authentication server and storing the token in the key store using the key, and
      transmitting the token to the virtual machine by routing the token through the plurality of nested virtual machines according to a destination that identifies the virtual machine, thereby authenticating the user to the virtual machine.

7. The method according to claim 6, wherein storing preferences comprises storing one or more of: a number of concurrent virtual machines accessible by the user in a single session, and an idle session termination interval.

8. The method according to claim 6, wherein storing preferences comprises storing in association with one or more of the virtual machines in the plurality of nested virtual machines.

9. The method according to claim 6, wherein the key store is indexed using a key that identifies one or more of: the host computer, a level at which the virtual machine is nested in the plurality of nested virtual machines, a maximum number of concurrent sessions for the virtual machine, a maximum number of excess authentication attempts, and a user session count.

10. The method according to claim 6, wherein obtaining the SSO authentication token from the authentication server comprises providing a domain key to the authentication server.

11. The method according to claim 6, further comprising analyzing keys in the key store for each user as an audit trail of authentication activities of the user within the plurality of nested virtual machines.

12. A tangible, computer-readable storage medium, in which is non-transitorily stored computer program code for performing a method of providing single sign-on (SSO), using an authentication server, to a plurality of nested virtual machines executing on a host computer, the method comprising:
   storing preferences, of each of a plurality of users, for accessing the plurality of nested virtual machines;
   determining, in response to receiving a request from a virtual machine in the plurality of nested virtual machines to authenticate a user in the plurality of users, whether to provide SSO authentication according to stored preferences of the user;

when SSO authentication should not be provided, requiring the user to provide login credentials; and when SSO authentication should be provided:
- determining whether a key store contains an SSO authentication token for the user according to a key identifying the virtual machine,
- if the key store does not contain such a token, obtaining an SSO authentication token from the authentication server and storing the token in the key store using the key, and
- transmitting the token to the virtual machine by routing the token through the plurality of nested virtual machines according to a destination that identifies the virtual machine, thereby authenticating the user to the virtual machine.

13. The storage medium according to claim 12, wherein storing preferences comprises storing one or more of: a number of concurrent virtual machines accessible by the user in a single session, and an idle session termination interval.

14. The storage medium according to claim 12, wherein storing preferences comprises storing in association with one or more of the virtual machines in the plurality of nested virtual machines.

15. The storage medium according to claim 12, wherein the key store is indexed using a key that identifies one or more of: the host computer, a level at which the virtual machine is nested in the plurality of nested virtual machines, a maximum number of concurrent sessions for the virtual machine, a maximum number of excess authentication attempts, and a user session count.

16. The storage medium according to claim 12, wherein obtaining the SSO authentication token from the authentication server comprises providing a domain key to the authentication server.

17. The storage medium according to claim 12, further comprising analyzing keys in the key store for each user as an audit trail of authentication activities of the user within the plurality of nested virtual machines.

* * * * *